Patented July 10, 1951

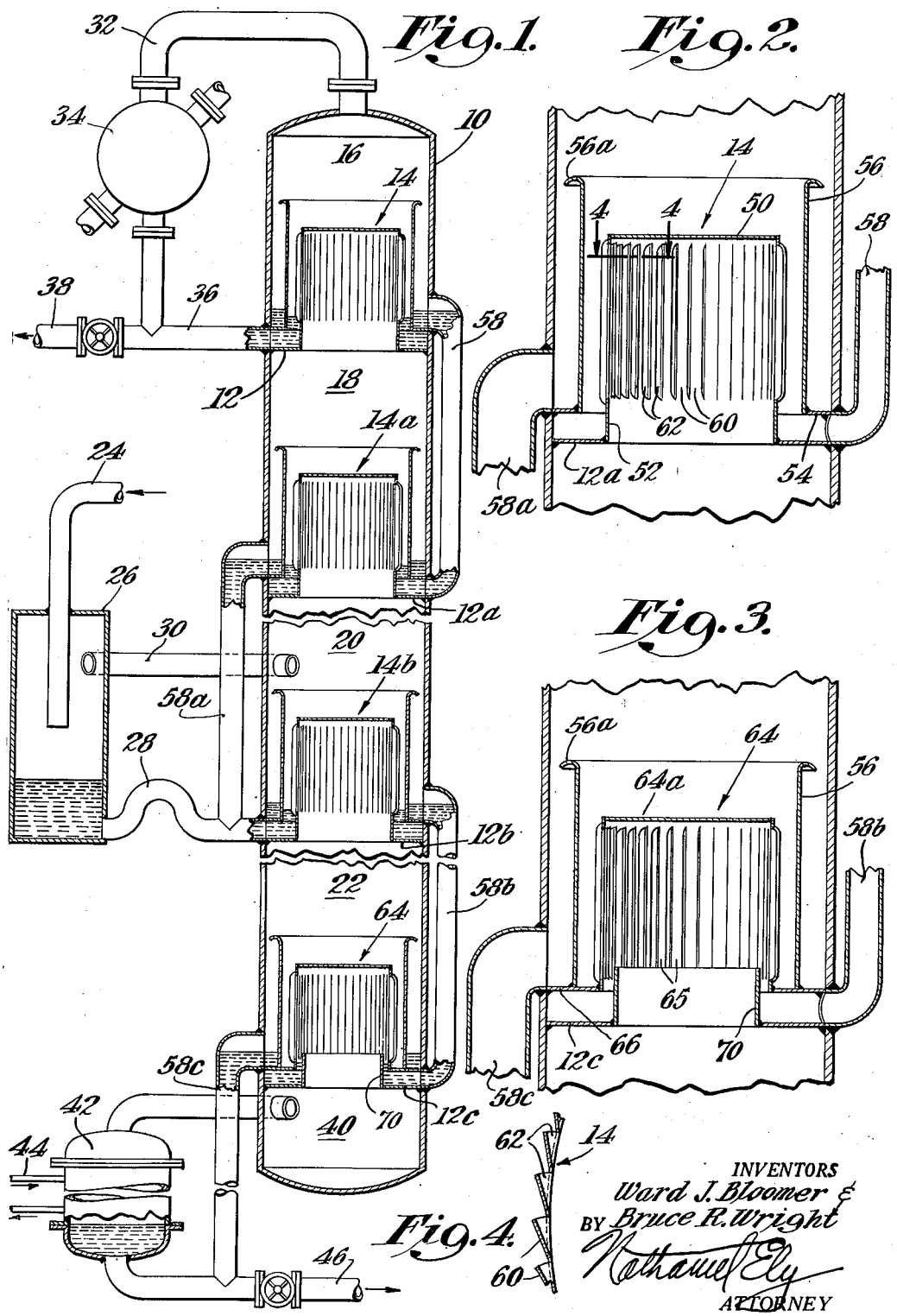

2,560,077

UNITED STATES PATENT OFFICE 2,560,077

APPARATUS FOR CONTACTING GASES AND LIQUIDS TO EFFECT CONCENTRATION, FRACTIONATION, AND THE LIKE

Ward J. Bloomer, Westfield, N. J., and Bruce R. Wright, Lakewood, Ohio, assignors, by direct and mesne assignments, to Centrifix Corporation, Cleveland, Ohio, a corporation of Ohio Application January 12, 1950, Serial No. 138,128

6 Claims. (Cl. 183—21)

This invention relates to an improvement in fixed centrifugal devices of the type heretofore used for contacting gases and liquids to effect concentration, fractionating or the like, and more particularly, of the type illustrated and described in United States Patent Number 2,189,491 dated February 6, 1940 to Charles Gilbert Hawley. It is an improvement on and modification of the invention disclosed in copending application, Serial No. 59,719 filed November 12, 1948 in the name of Ward J. Bloomer.

Fixed centrifugal devices of the type under consideration comprise essentially an element termed a tuyère, a cylindrical form and presenting a circumferential series of tangential blades extending upwardly from the bottom of the element and forming narrow passages between them. In contacting a liquid with a gas, for example, the liquid is fed to the closed end of the tuyère and the gas is introduced through the narrow passages between the tangential blades at a high velocity. The gas thus enters the tuyère tangentially and hence within the tuyère travels circumferentially and longitudinally of the axis thereof, picking up and dispersing the liquid in fine particles within its whirling stream or vortex. The particles of liquid in the whirling stream of gas are next consolidated in an imperforate ring into which the tuyère discharges, and the liquid is then thrown out by the centrifugal effect, collected and drained away from the gas.

In the operation of such a device, the whirling stream of gas and particles of liquid within the tuyère travel vertically, as well as circumferentially toward the imperforate ring, into which the tuyère discharges, or which in effect constitutes a continuation of the tuyère. On reaching the imperforate ring the liquid particles coalesce into a mass or stream due to the centrifugal force exerted on the liquid particles which are held to the wall of the ring by the centrifugal force exerted on them. The liquid, on reaching the upper edge of the ring, is released and discharged upwardly and laterally into a collecting chamber under the forces producing the upward spiraling movement of the gas and liquid in the tuyère and by which the liquid is raised, admixed with the gas and carried through the tuyère.

In accordance with the present invention, we propose to invert the tuyère whereby upwardly rising vapors or gases will pass first into the tuyère, and thence through the blades whereby the desired mixing is established. The liquid to be mixed with vapors may be on either the inside or the outside of the tuyère, adjacent the open end, and the unit may be installed in series or parallel, or both, as in a fractionating column.

While broadly, our invention contemplates an improved method and apparatus for contacting all liquids and gases, a primary object of our invention is to utilize a series of fixed inverted centrifugal tuyères in a suitable column for the fractional distillation of mixed component materials.

Having now indicated in a general way, the nature and purpose of this invention, we will proceed with a detailed description of preferred forms of embodiment thereof, with reference to the accompanying drawings in which:

Fig. 1 is a view partly in section and partly broken away, showing adaptation of the tuyères to apparatus for fractionating mixed component materials.

Fig. 2 is an enlarged central vertical section of the improved form of a fixed centrifugal device and associated parts.

Fig. 3 is a view similar to Fig. 2 showing a modified form of construction.

Fig. 4 is a detailed horizontal cross sectional view taken substantially on the line 4—4 of Fig. 2.

With particular reference to Fig. 1, the fractionating column is indicated generally at 10 and is provided with a series of decks 12, 12a, 12b, and 12c in each of which is mounted one or more tuyères generally indicated at 14. The space between the decks 12 represented by the chambers 16, 18, 20 and 22 is largely vapor space.

In a typical unit, a petroleum charge is preheated in a suitable heater, not shown, and may be introduced at 24 to a liquid-vapor separator generally indicated at 26, which may be of any desired type. In such unit, the unflashed liquid, cooled by evaporation, falls to the bottom of the separator and may be introduced by the line 28 to intermediate tuyère 14b. The flashed vapors from the separator enter vapor space 20 above the tuyère 14b through line 30.

In a typical fractionation unit, a series of decks, each having the tuyères 14 accomplish a small temperature change on the mixed component material so that ultimately the vapors, denuded of heavy components, are removed through the overhead vapor outlet 32, and these vapors in turn may pass through a condenser 34 with reflux condensate returned to the top tuyère 14 through the line 36, and the net condensate discharged through the line 38.

At the same time, the heavier liquid components are concentrated and collected in the lowermost chamber 40 the liquid level being maintained at a desired level by suitable liquid level control means not shown. Usually an external reboiler 42 is provided to add heat to drive off light ends from the collected liquid, such reboiler being supplied with steam or other heating medium through line 44. The hot vapors discharged from the reboiler 42 are returned to the vapor space 40 below the lowest tuyère. Net bottoms product is removed through the line 46.

Referring more particularly to Fig. 2, the tuyère 14 is generally of cylindrical form and fabricated from any suitable material, as for example, sheet metal or alloys, as necessary. The particular tuyère 14 has an imperforate top 50, and is supported in an inverted position by mounting the imperforate portion 52 of the side wall on the deck 12a. The deck 12a may be recessed below a second apertured partition indicated at 54, such partition being provided with a vertical upwardly open chimney 56. The arrangement is such that liquid passing down through the down pipe 58 or entering the liquid chamber between the deck and partition through the reflux line 36 or the initial feed line 28, will surround the imperforate wall 52 and will rise to a suitable level such as above the bottom of the blades 60.

The upper portion of the tuyère 14 presents a circumferential series of closely spaced tangential blades 60 forming narrow passages 62 between them, and which extend vertically from adjacent the imperforate portion 52 to the closed top 50. These blades may be readily formed by slitting and bending from the wall of the tuyère and they may be straight and uniform as shown, or enlarged at the bottom as shown in the copending application of Bloomer referred to, and they may be either of the single bank or multiple bank type.

In operation, the upwardly rising vapors which enter the open lower end of the tuyère 14 will move outwardly through the blade openings thereby creating a rotary motion within the chimney 56. This will induce and entrain liquid surrounding the tuyère to establish a highly intimate mix. As a result, some of the lighter ends of the feed liquid are vaporized whereas heavier ends are maintained in a liquid condition with the result that the movement will throw out the liquid from the vapors as the mixture discharges over the curved edge 56a of the chimney.

It is found that the lip 56a is of particular advantage in the removal of liquid from the vapors discharging from the chimney 56. Not only is it an aid in coalescing and carrying off the liquid and preventing reentrainment, but it also materially aids in the efficiency of separation which is materially effected by the velocity of gases or vapors through the tuyère blades. With a high velocity, there is a greater tendency of reentrainment unless the lip and its curved shape is utilized. Generally we find it desirable to maintain a curvature which is substantially semi-circular and with a radius of not less than ¼ inch on a chimney of 3 inches in diameter and with approximately double the radius on a chimney of double the diameter.

In operation, we find it desirable to maintain a gas velocity of not less than 30 feet per second through the blades and preferably of the order of 50 to 60 feet per second through the blades to establish the desired mixing and to effectively carry the liquid upward through the chimney and over the lip so that it may in turn pass downward through the external downcomer 58a.

In a typical construction, the tuyère had a nominal diameter of 7 inches utilizing 50 blades, the width of which was 0.39 inch forming a blade opening of 3/32 of an inch. The blade area of .25 square foot was approximately 94% of the tuyère cross sectional area. The total height of the tuyère was 7 inches and with 1200 cubic feet per minute of air it was possible to pick up 1400 gallons per hour of water.

It will be appreciated that one of the advantages of the construction shown in Fig. 2 as more particularly applied to Fig. 1, is that assuming a uniform pressure drop between chambers 16, 18, 20 and 22 of 6 inches of water, which is approximately that required for the necessary mixing, the pressure drop between chambers 16 and 18 is thus only 6 inches of water, and the liquid in the downcomer 58 need only overcome this pressure, inasmuch as the liquid which passes down from the space outside of the chimney enters an area exposed to the pressure within the chamber 18. In this case, the liquid does not pass through the tuyère. The vapors, however, may pass unhindered directly upward from chamber 20 through the tuyère 14a to induce the liquid into the desired vortical path. Only the envelope pressure drop has to be overcome.

A modified form of tuyère is shown in Fig. 3, such tuyère being generally indicated at 64 and similarly having the closed top 64a and the closely spaced tangential blades 65 forming the narrow passages in the side. In this case, the open end of the tuyère is mounted in liquid tight relation with the secondary partition 66 across the column which is above the deck 12c. The deck 12c is provided with a central short cylindrical portion 70 of smaller diameter than the tuyère 64 and it projects above the open end of the tuyère to a position above the lowermost end of the blades.

In this construction, the liquid which passes downward through the downcomer 58b will fill the space between the deck 12c and the partition 66 and will rise to such a level that it may be entrained by the gases or vapors passing through the deck opening 70. The vapors will then carry the liquid through the blades for the desired mixing with the ultimate discharge over the lip 56a of the chimney 56 as in the prior case.

There is a difference, however, in the operation. As shown in the lower part of Fig. 1, the difference in pressure between the chamber 20 and the chamber 40 includes the pressure drop between two decks instead of one, and it is thus necessary to have a greater seal height to prevent the loss of vapors through the downcomer. In other words, feeding the liquid inside the tuyère has the disadvantage of forcing the reflux seal to balance the entire drop through the tuyère, instead of only the centrifugal force zone. It has the advantage however, of giving a greater mixing effect as the liquid and vapors pass through the blades.

Our invention is applicable to various mixing and separating operations and we therefore desire a broad interpretation thereof within the scope and spirit of the description hereof and of the claims appended thereinafter.

We claim:

1. In combination with a chamber having a transverse deck and a second transverse partition thereabove, a fixed centrifugal device comprising a cylindrical shell closed at its upper end and open at its lower end, said lower end being in gas tight sealed relation with the lower transverse deck, said fixed centrifugal device having a series of tangentially extending blades disposed circumferentially of said shell, forming between them a series of passages extending vertically from the open end for the entry of a vapor into said shell, a cylindrical chimney surrounding said fixed centrifugal device in gas tight sealed relation to the upper transverse partition and forming a mixing chamber between said fixed centrifugal device and said chimney, and upwardly extending curved integral with the open end of the chimney, means to draw off liquid from the space surrounding the chimney, and means to feed liquid into the vapor path for the mixing therewith.

2. A fluid mixing device of the class described in claim 1 in which the liquid surrounds the inside of the tuyère.

3. A fluid mixing device of the class described in claim 1 in which the liquid surrounds the outside of the tuyère.

4. In a fluid mixing device, the combination comprising a cylindrical tuyère having a solid top wall, a side wall provided with a plurality of blades forming inwardly convergent gas paths the bottom of the tuyère being open, a fluid container having a side wall surrounding the lower portion of said tuyère side wall, means for continuously feeding a fluid to said container, and means for supplying a gas current upwardly over the surface of the fluid in said container and through said gas paths between said blades for entraining said fluid and mixing it with the gas of said current, said fluid container being cylindrical and having an uninterrupted inner surface and being surmounted by a continuous outwardly curved lip portion, said fluid container causing coalescence of liquid particles which are drawn off from the lip portion separate from the gas.

5. A liquid and vapor contact apparatus comprising a tower having a vapor inlet and a vapor outlet, a plurality of decks dividing the tower into a plurality of units, a fixed centrifugal device mounted in each deck comprising a cylindrical shell open at its lower end and closed at its upper end, a series of tangentially extending blades disposed circumferentially of said shell forming between the upper and lower end a series of vapor passages extending vertically therebetween, means for forming an annular liquid space at the lower ends of the passages, a surrounding imperforate internally uninterrupted cylindrical chimney having an outwardly extending continuous lip disposed about the upper end thereof, means for admitting liquid to the annular liquid spaces at the lower ends of each centrifugal device, means for passing vapor through the vapor passages to entrain the liquid therein and means for conducting the liquid with entrained material from each deck.

6. A liquid and vapor contact apparatus as claimed in claim 5 in which the liquid is introduced into the space between the tuyère and the chimney under a seal head substantially equal to the pressure difference between adjacent decks.

WARD J. BLOOMER.
BRUCE R. WRIGHT.

REFERENCES CITED

The following references are of record in the file of this patent:

UNITED STATES PATENTS

| Number | Name | Date |
|---|---|---|
| 1,482,408 | Piron | Feb. 5, 1924 |
| 1,846,248 | Clarke | Feb. 23, 1932 |
| 1,894,744 | Hawley | Jan. 17, 1933 |
| 2,189,491 | Hawley | Feb. 6, 1940 |
| 2,345,667 | Hachmuth | Apr. 4, 1944 |

Certificate of Correction

Patent No. 2,560,077                                July 10, 1951

WARD J. BLOOMER ET AL.

It is hereby certified that error appears in the printed specification of the above numbered patent requiring correction as follows:

Column 5, line 10, for "and", second occurrence, read *an*; line 11, after "curved" insert *lip*;

and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*